United States Patent [19]
Morrish

[11] Patent Number: 5,420,484
[45] Date of Patent: May 30, 1995

[54] DEFLECTION APPARATUS FOR RASTER SCANNED CRT DISPLAYS

[75] Inventor: Andrew J. Morrish, San Jose, Calif.

[73] Assignee: International Business Machines Corporation, Armonk, N.Y.

[21] Appl. No.: 42,936

[22] Filed: Apr. 5, 1993

[30] Foreign Application Priority Data

Jul. 25, 1992 [GB] United Kingdom ............... 9215857

[51] Int. Cl.$^6$ .................. G09G 1/04; H01J 29/56; H01J 29/70
[52] U.S. Cl. ............................... 315/408; 315/370; 315/387; 315/411
[58] Field of Search ............ 315/387, 389, 408, 411, 315/370; 307/228

[56] References Cited

U.S. PATENT DOCUMENTS

| | | | |
|---|---|---|---|
| 4,047,052 | 9/1977 | Koubek et al. | 307/228 |
| 4,104,567 | 8/1978 | Peer et al. | 315/387 |
| 5,023,523 | 6/1991 | Tomita | 315/364 |
| 5,049,792 | 9/1991 | Oh | 315/411 |

Primary Examiner—Gregory C. Issing
Attorney, Agent, or Firm—David Aker

[57] ABSTRACT

Deflection apparatus for a raster scanned cathode ray tube display comprises a ramp generator (210) for producing a current ramp signal synchronised to a raster synchronisation signal. A ramp regulator (230) is connected to the generator (210) for varying the amplitude of the scan signal as a function of the difference between a reference input and a feedback signal. A feedback circuit (220) connected to the generator (210) and to the regulator (230) for generating the feedback signal as a function of the amplitude and frequency of the line scan signal. A multiplier (250) is connected to the regulator and for varying the reference input as a function of an integer multiple of the frequency of the raster synchronisation signal. Any scan signal frequency component in the feedback signal is cancelled at the input to the regulator by introducing, via the multiplier (250), a scan signal frequency component to the reference input. Because the displayed picture size is thus made independent of scan signal frequency, the deflection apparatus can maintain a constant picture size despite variations in scanning signal frequency without the bandwidth limitations of the prior art.

20 Claims, 5 Drawing Sheets

DEFLECTION APPARATUS FOR RASTER SCANNED CRT DISPLAYS

TECHNICAL FIELD

The present invention relates to deflection apparatus for enabling a raster scanned CRT display to maintain a constant picture size despite variations in raster line scanning frequency.

BACKGROUND ART

Many raster scanned CRT displays are now designed to be compatible with a wide range of computer systems each capable of generating one or more different raster display formats. Each raster display format is generally characterised by a different pair of line and frame scanning frequencies.

A conventional line scan circuit for driving the horizontal deflection coils for a CRT display comprises a ramp generator for producing a line scan current signal in the deflection coils in synchronisation with a raster line synchronisation (sync) signal generated by the host computer. The amplitude of the line scan signal is inversely proportional to the frequency of the line sync signal. Therefore, the width of the picture displayed on the CRT screen is inversely proportional to the frequency of the line sync signal.

The conventional CRT displays that are capable of displaying different raster display formats, a ramp regulator is connected to the ramp generator to reduce the effect of changes in line sync signal frequency on displayed picture width by varying the amplitude of the line scan signal as a function of a reference input and a feedback signal. The feedback signal is generated as a function of the line scan signal by a feedback circuit connected to the ramp generator and the regulator. The feedback circuit conventionally comprises a low pass filter with a time constant that is long enough to remove the line scan frequency component from the feedback signal. The low pass filter therefore limits the range of line scan frequencies within which the display can operate with constant picture width. Furthermore, increasing the time constant of tile filter increases the transient response time of the regulator when switching between different display formats.

In accordance with the present invention, there is now provided deflection apparatus for a raster scanned cathode ray tube display, the apparatus comprising: a ramp generator for receiving a raster synchronisation signal and for producing a raster scan signal synchronised to the raster synchronisation signal; a reference source for generating a reference input; a ramp regulator connected to the generator for varying the amplitude of the scan signal as a function of the difference between the reference input and a feedback signal; and a feedback circuit connected to the generator and to the regulator for generating the feedback signal as a function of the amplitude and frequency of the line scan signal; characterised in that the apparatus further comprises a multiplier connected to the regulator for multiplying the reference input by an integer multiple of the frequency of the raster synchronisation signal.

The present invention stems from a realisation that any scan signal frequency component in the feedback signal can be cancelled at the input to the regulator by introducing a scan signal frequency component to tile reference input. Therefore, in accordance with the present invention, displayed picture size can now be made independent of scan signal frequency. Deflection apparatus of the present invention can therefore advantageously maintain a constant picture size despite variations in scanning signal frequency without the bandwidth limitations of tile prior art.

Preferably, the multiplier comprises a switch circuit for alternating the reference input between greater and lesser reference levels in synchronisation with the raster synchronisation signal. The present invention can thus be advantageously implemented without complex low pass filter networks.

In a preferred embodiment of the present invention, the switch circuit is connected to the reference source and to the regulator for alternately connecting and disconnecting the reference source to the regulator in synchronisation with the raster synchronisation signal. The present invention may thus be advantageously implemented by a signal transistor gate in a signal path.

The multiplier may comprise a monostable circuit connected to the switch circuit for generating pulses of predetermined length for switching the switch circuit in synchronisation with the raster synchronisation signal. The monostable circuit advantageously alleviates any frequency dependency in the pulse length of the synchronisation signal.

In a preferred embodiment of the present invention to be described shortly, the generator comprises a flyback circuit; and the regulator comprises a switch circuit for varying the voltage across the flyback circuit in response to a pulse width modulated signal, and a pulse width modulator connected to the switch circuit, the multiplier, and the feedback circuit for generating the pulse width modulated signal as a function of said difference between the reference input and the feedback signal.

The integer multiple is preferably greater than one to improve noise rejection. In a preferred embodiment of the present invention, the integer multiple is, for example, set to two.

It will be appreciated that the present invention extends to a CRT display comprising such deflection apparatus.

It will also be appreciated that the present invention extends to a computer system comprising: a processor for generating raster syncronisation signals and for varying the frequency of at least one of the raster synchronisation signals to produce different display modes; and a CRT display as referred to in the preceding paragraph connected to the processor for producing a picture on the display in response to the raster synchronisation signals and for maintaining the size of the picture substantially constant between the different display modes.

BRIEF DESCRIPTION OF THE DRAWINGS

A preferred embodiment of the present invention will now be described, by way of example only, with reference to the accompanying drawings in which.

DETAILED DESCRIPTION OF THE PREFERRED EMBODIMENTS

Figure 1:
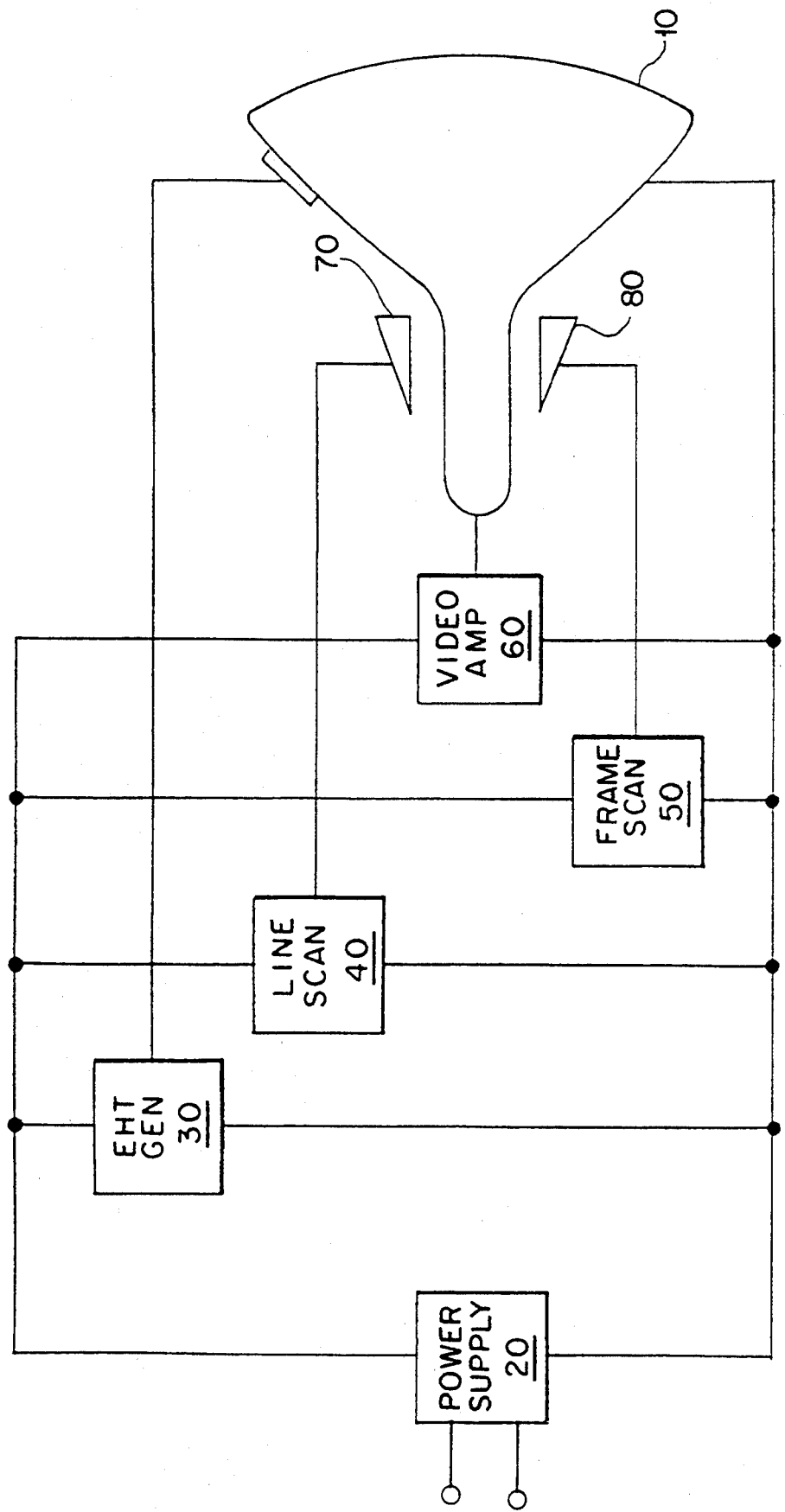
FIG. 1 is a block diagram of a CRT display.

Referring first to FIG. 1, a CRT display comprises a Cathode Ray Tube (CRT) 10 connected to an Extra High Tension voltage (EHT) generator 30 and a video amplifier 60. Line and frame deflection coils, 70 and 80 respectively, are disposed around the neck of the CRT 10. Deflection coils 70 and 80 are connected to line and frame scan circuits, 40 and 50, respectively. A power supply 20 is connected via power supply rails to the EHT generator 30, video amplifier 60 and scan circuits 40 and 50.

In operation, EHT generator 30 generates an electric field within CRT 10 for accelerating electrons in beams towards the screen of CRT 10. Line and frame scan circuits 40 and 50 generate line and frame scan currents in deflection coils 70 and 80. The line and frame scan currents are in the form of ramp signals to produce time-varying magnetic fields that scan the electron beams across CRT screen 10 in a raster pattern. The line and frame scan signals are synchronised by line and frame scan circuits 40 and 50 to input line and frame sync signals generated by a host computer system (not shown). Video amplifier 60 modulates the electron beams to produce an output display on CRT 10 as a function of input video signals also generated by the host computer system.

Figure 2:
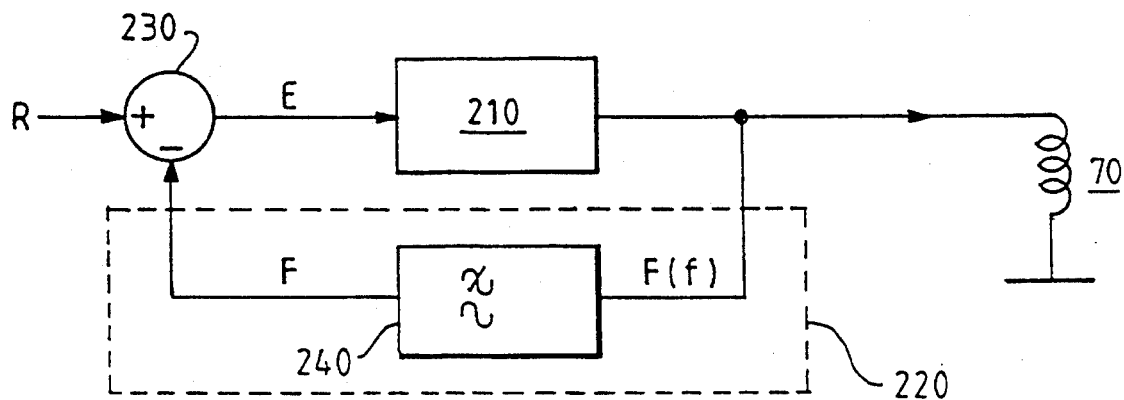
FIG. 2 is a block diagram of a conventional line scan circuit.

Referring now to FIG. 2, a conventional line scan circuit 40, for a CRT display that is capable of displaying different raster display formats, comprises a ramp generator 210 connected to horizontal deflection coils 70. A ramp regulator 230 is connected to the ramp generator. The output of the ramp generator is connected to the input of the ramp regulator 230 via a feedback circuit 220. Feedback circuit 220 comprises a low pass filter 240.

In operation, ramp generator 210 produces a line scan current signal in deflection coils 70. The line scan current signal is synchronised to the line sync signal from the host computer.

Ramp regulator 230 generates an error signal for controlling the amplitude of the line scan current signal and therefore width of picture displayed on CRT 10. The picture width can be adjusted by adjusting a reference input value R.

Feedback circuit 220 provides a feedback signal F derived from the line scan current signal to ramp regulator 230. Low pass filter 240 removes the line scan frequency component f from the feedback signal F. Error signal E is determined by ramp regulator 230 as a function of the difference between reference value R and feedback signal F.

Ramp generator 210, ramp regulator 230, and feedback circuit 220 therefore constitute a negative feedback control loop that operates to maintain the width of the picture displayed on the CRT constant despite changes in the horizontal scan frequency. However, the range of frequencies over which the feedback loop is capable of operating to maintain the picture width constant is limited by the frequency response of low pass filter 240. Any frequency component of the feedback signal admitted by low pass filter 240 will interfere with the picture width. Furthermore, any increase in the time constant of low pass filter 240, made in an effort to improve the effective range of the feedback loop, will produce a corresponding increase in the transient response of the line scan circuit to changes in display format.

Figure 3:
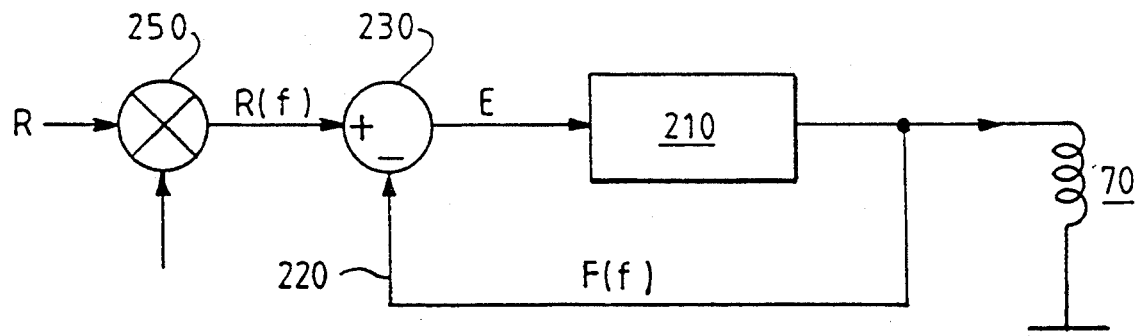
FIG. 3 is a block diagram of a line scan circuit of the present invention.

Referring now to FIG. 3, in a line scan circuit of the present invention, a multiplier 250 is connected to the input of ramp regulator 230. The introduction of multiplier 250 permits the feedback circuit to deliver the feedback signal F(f) to the ramp regulator without low pass filtering. In operation, multiplier 250 generates output R(f) as a function of the product of R and horizontal frequency f. Because Error Signal E tends to zero by virtue of the negative feedback loop:

$$R(f) - F(f) = E = 0$$

Therefore, $R(f) = F(f)$

Hence $R = F$.

In other words, any line scan frequency component f in the feedback signal F(f) is cancelled at the input of the regulator 230 by the line scan frequency component f introduced by multiplier 250.

Figure 4:
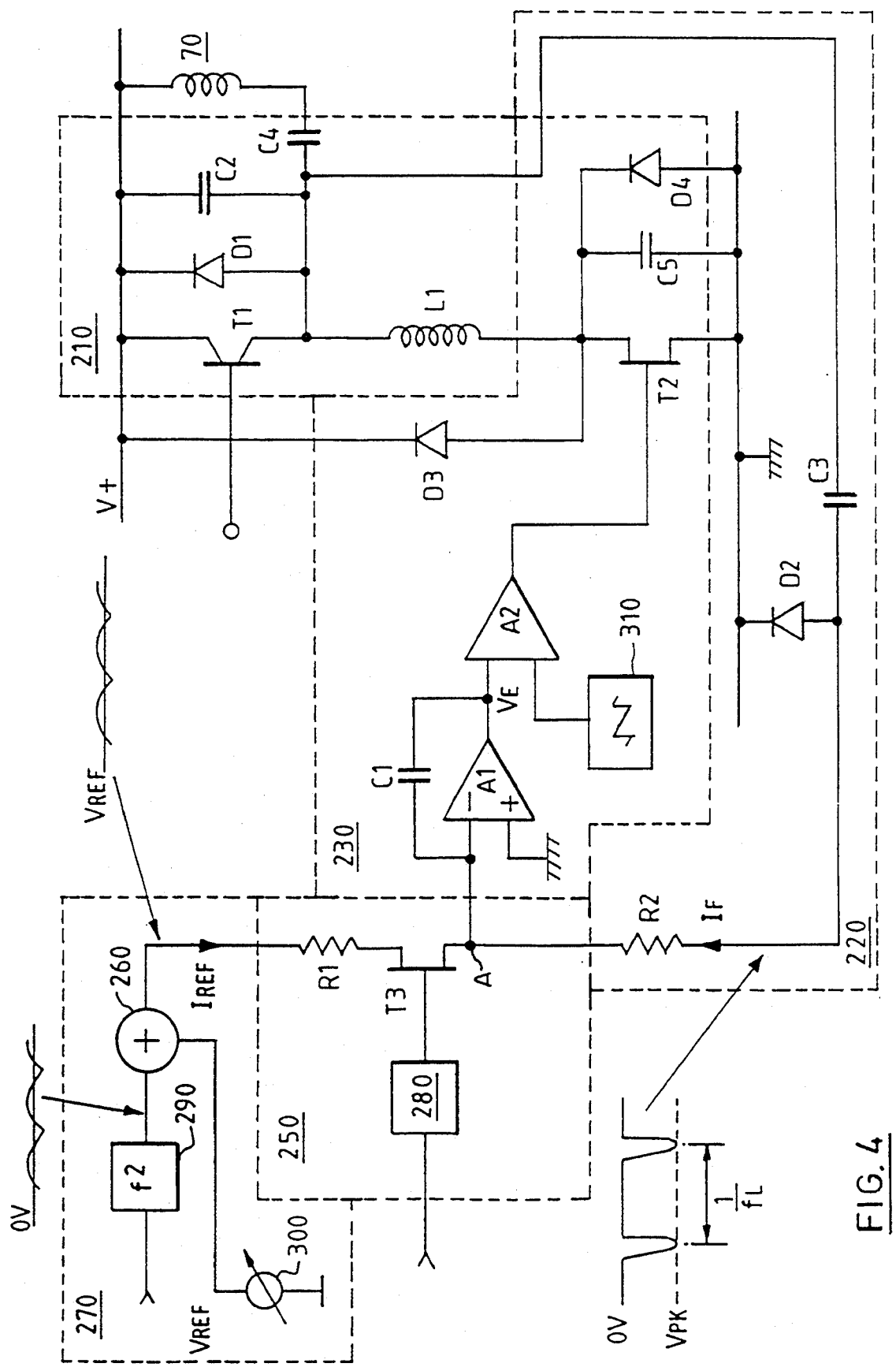
FIG. 4 is a circuit diagram of a line scan circuit of the present invention.

Referring now to FIG. 4, in an example of a line scan circuit of the present invention, ramp generator 210 comprises a bipolar transistor T1 connected at its collector to a relatively high voltage ratio of the power supply (eg: 120 V) and at its emitter to a one terminal of a capacitor C2 and to one terminal of an inductor L1. A diode D1 is connected in reverse biased configuration across the collector emitter junction of T1. The other terminal of C2 is connected to high voltage rail V+. Line deflection coil 70 is connected in series with an S correction capacitor C4 across C2.T1, D1, C2, and L1 collectively form an example of a flyback circuit, the operation of which is well known and will therefore be described only briefly hereinafter. The other terminal of L1 is connected to the drain of a field effect transistor (FET) T2.

Ramp regulator 230 comprises a field effect transistor T2. The source of T2 is connected to ground. A diode D3 is connected between voltage rail V+ and the drain of T2. The gate of T2 is connected to the output of a comparator A2. An integrator, comprising an operational amplifier A1 with a feedback loop formed by a capacitor C1, provides a DC input voltage Ve to A2. The other input of A2 is connected to a voltage ramp signal generator 310.

Feedback circuit 220 comprises a diode D2, a capacitor C3 and a resistor R2 coupling the inverting input of A1 to the emitter of T1.

Multiplier 250 comprises an FET T3 with its source connected to the inverting input of A1 at node A and its drain connected to a reference source 260 via a resistor R1. The gate of T3 is connected to the output of a monostable circuit 280.

Reference source 270 comprises a summing stage 260 having an output connected to R1. The inputs to summing stage 260 are respectively connected to a function generator 290 and a variable voltage source 300.

In operation, T1 is switched on and off in synchronisation with the line sync signal by a base current signal of period 1/f1, where f1 is the frequency of the line sync signal. The base current signal is synchronised to the line sync signal by a phase locked loop (not shown). As the transistor is switched, energy is stored alternately in C2 and L1. The transfer of energy produces a current ramp signal in line deflection coil 70 of period 1/f1. During each retrace portion of the line scan current, a negative-going voltage pulse Vpk is generated at the emitter of T1. The amplitude of the current ramp signal, and therefore the magnitude of Vpk is determined by the mean voltage across L1 during period 1/f1.

In ramp regulator 230, A2, A1, and C1 form a pulse width modulator for generating a square wave voltage signal of period 1/f1 to switch T2 in synchronisation with the line sync signal. The pulse width of the square wave voltage signal determines the mean voltage across L1. When T1 is on and T2 is off, the voltage across L1 is negligible because D3 conducts. However, when T1 and T2 are on, the voltage across L1 is near V+ because D3 is reversed biased. A2 determines the pulse width of the signal at the gate of T2 as a function of the difference between voltage Ve at the output of A1 and a voltage ramp signal of period 1/f1 generated by voltage ramp signal generator 310 in synchronisation with the line sync signal.

Vpk is DC restored by D2 and C3 of feedback circuit 220 and fed back by the negative feedback loop to the input of ramp regulator 230 at node A, via R2.

In reference source 270, function generator 290 produces a parabolic voltage signal in response to a voltage ramp signal representative of the frame scan current produced by frame scan circuit 40. The parabolic voltage signal determines East-West Pincushion correction for the line scan current. Variable voltage source 300 produces a DC voltage level, Vref, that can be varied to selectively adjust the width of the picture displayed on CRT 10 during, for example, testing of the display. The parabolic voltage signal produced by function generator 290 is superposed on Vref by summing stage 260.

In multiplier 250, monostable circuit 280 generates an output pulse of length tp in response to each pulse of a clock signal. The clock signal is synchronised to the line sync signal by the aforementioned phase locked loop (not shown). The frequency of the clock signal is set to 2f1. T3 is switched by the pulses at the output of the monostable. Reference source 270 is therefore alternately connected and disconnected to the input of ramp regulator 230 in synchronisation with the line sync signal. Specifically, when T3 is on, Vref causes current Iref to flow through R1 to node A. When T3 is off, the current path from summing stage 260 to node A is closed, and Iref does not flow.

Node A is a virtual earth. The feedback control loop constituted by ramp regulator 230 and feedback circuit 220 therefore tends to balance the net currents Iref and If flowing into node A through R1 and R2 respectively.

$$If = \frac{Vpk \cdot tf \cdot f1}{R2 \cdot root2}$$

Where tf is the width of each pulse at the emitter of T1 and is determined by the resonance of L1 and C2.

$$If = \frac{Vpk \cdot f1 \cdot pi \cdot root(L1 \cdot C2)}{R2 \cdot root2}$$

$$Iref = \frac{2 \cdot f1 \cdot Vref \cdot tp}{R1}$$

$$Iref = Ifb$$

$$\text{Therefore } Vpk = \frac{2 \cdot f1 \cdot tp \cdot Vref \cdot R2 \cdot root2}{R1 \cdot f1 \cdot pi \cdot root(L1 \cdot C2)}$$

-continued $$\text{Thus } Vpk = \frac{2 \cdot Vref \cdot R2 \cdot tp \cdot root2}{pi \cdot R1 \cdot root(L1 \cdot C2)}$$

Thus, in accordance with the present invention, Vpk and therefore the picture width is made independent of the line scan frequency by multiplying the reference input to ramp regulator 230 by the line scan frequency. The line scan circuit of the present invention can therefore maintain a constant picture width over a greater range of line scan frequencies than conventional line scan circuits.

Figure 4A:
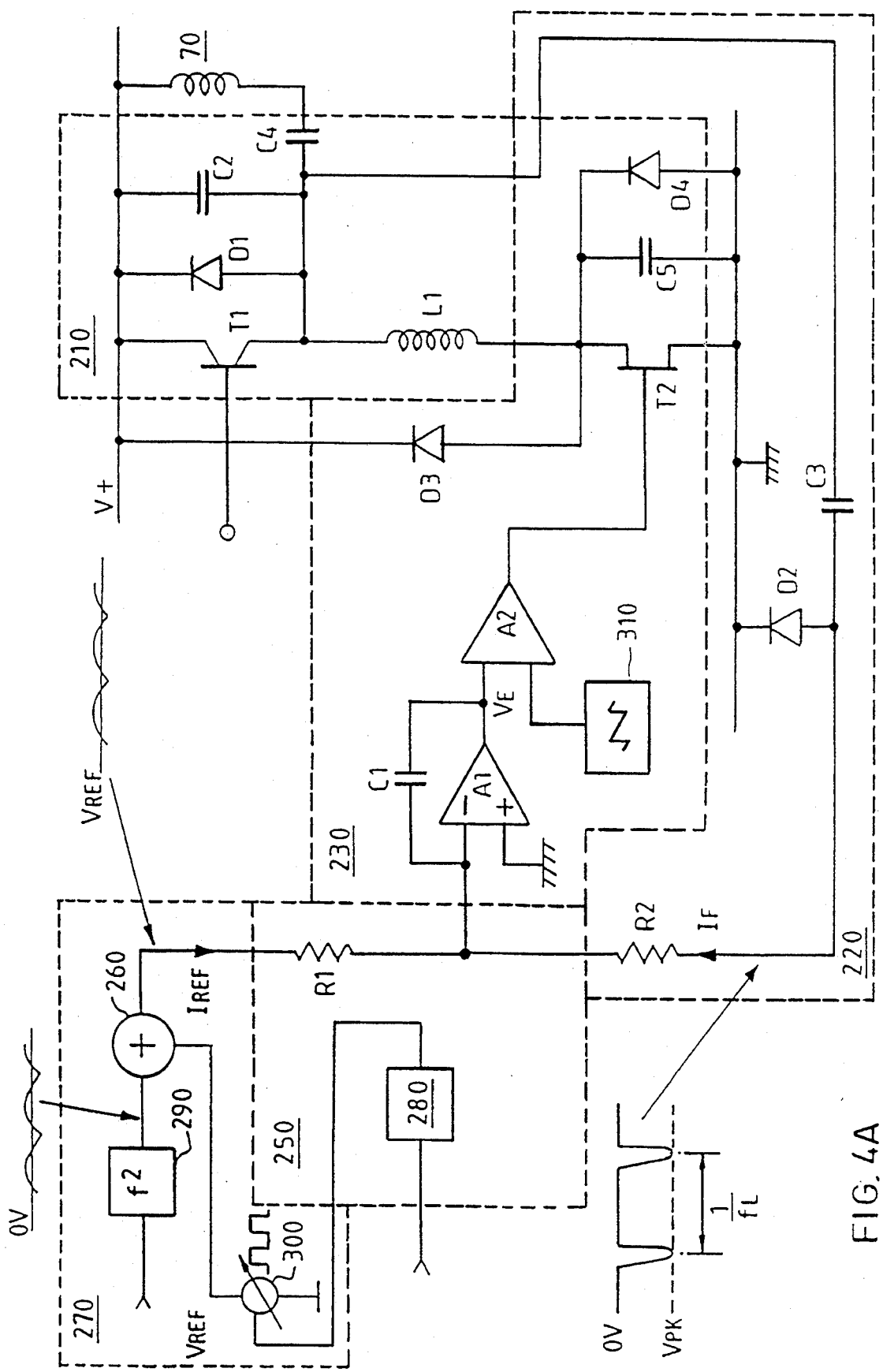
FIG. 4A is a circuit diagram of another embodiment of a line scan circuit in accordance with the invention.

In the embodiment of the present invention hereinbefore described, the frequency of the clock signal was set by the phase locked loop to twice the line scan frequency. It will now however be appreciated that, in other embodiments of the present invention, the frequency of the clock signal may be set by the phase locked loop to an integer multiple of the line scan frequency greater than or less then two, depending on the degree of noise rejection required. Furthermore, in the embodiment of the present invention hereinbefore described, multiplier 250 multiplied the reference input to ramp generator 230 by alternately disconnecting and connecting reference source 270 to ramp regulator 230 in synchronisation with the line sync signal. However, it will be appreciated that, in other embodiments of the present invention, multiplier 280 may introduce a line scan frequency component to the reference input by, for example, amplitude modulating the output of reference source 270 in synchronisation with the line sync signal. Such amplitude modulation may, for example, involve alternating the output of the reference source between greater and lesser levels in synchronisation with the line sync signal as illustrated in FIG. 4A.

Figure 5:
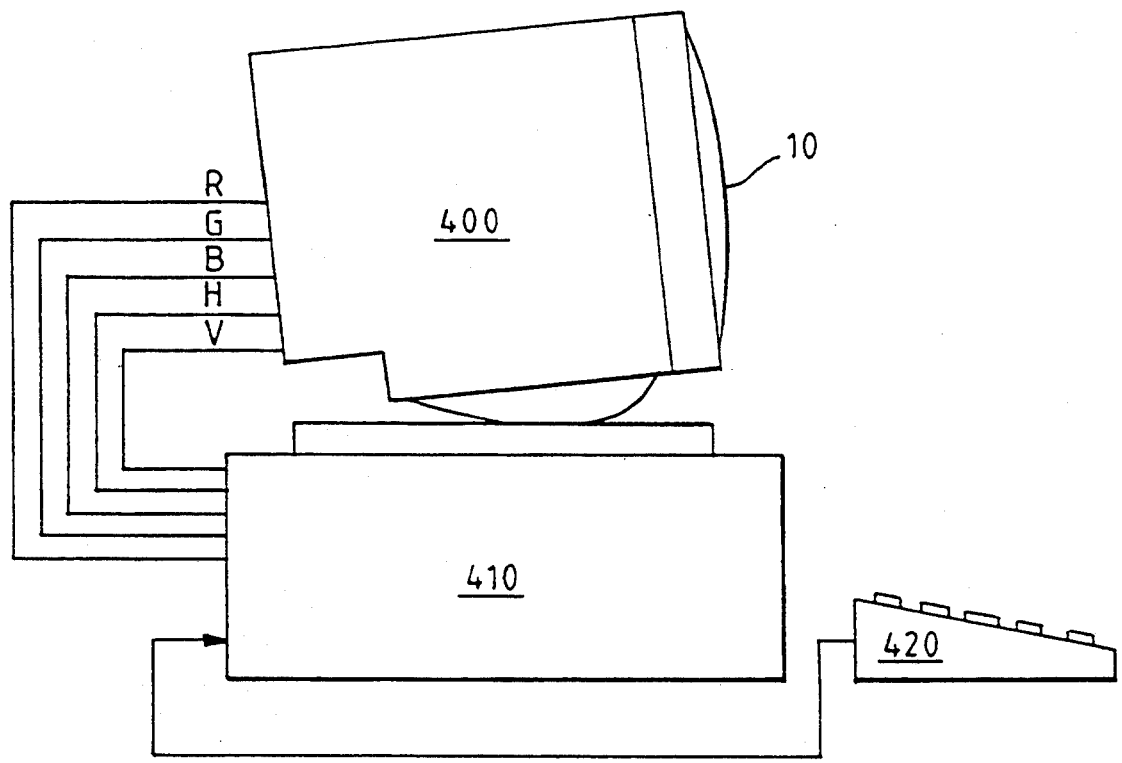
FIG. 5 is a side view of a computer system comprising a CRT display having a line scan circuit of the present invention.

FIG. 5 shows a computer system including a CRT display 400 comprising a line scan circuit of the present invention. The computer system comprises a processor 410 connected to the CRT display 400 and to an input device 420 such as keyboard 420. The processor may be in the form of a microcomputer such as an IBM Personal System/2 Model 70 microcomputer (Personal System/2 is a trademark of International Business Machines Corporation) or a mainframe computer. In operation, the CRF display generates a picture in response to Red, Green and Blue, R, G and B, video signals and line and frame, H and V, sync signals generated by the processor. The processor configures the CRT display to operate in different display modes by varying the frequency of one or more of the sync signals. However, in accordance with the present invention, the size of the picture displayed by the CRT display is maintained substantially constant between the different display modes.

What is claimed:

1. Deflection apparatus for a raster scanned cathode ray tube display, the apparatus comprising:
   a ramp generator (210) for receiving a raster synchronisation signal and for producing a raster scan signal synchronised to the raster synchronisation signal;
   a reference source (270) for generating a reference input;
   a ramp regulator (230) connected to the generator (210) for varying the amplitude of the scan signal as a function of the difference between the reference input and a feedback signal;

a feedback circuit (220) connected to tile generator (210) and to the regulator (230) for generating the feedback signal as a function of tile amplitude and frequency of the line scan signal; and a multiplier (250) connected to the regulator for multiplying tile reference input by an integer multiple of the frequency of the raster synchronisation signal; wherein the multiplier (250) comprises a switch circuit (T3) connected to the reference source (270) and to the regulator (230) for alternately connecting and disconnecting the reference source to the regulator (230) in synchronisation with the raster synchronisation signal.

2. Apparatus as claimed in claim 1, wherein the multiplier (250) further comprises a monostable circuit (280) connected to the switch circuit (T3) for generating pulses of predetermined length for switching the switch circuit in synchronisation with the raster synchronisation signal.

3. Apparatus as claimed in claim 2, wherein the generator (210) comprises a flyback circuit (T1); and the regulator (230) comprises a switch circuit (T2) for varying the voltage across the flyback circuit in response to a pulse width modulated signal, and a pulse width modulator (A1, A2, 290) connected to the switch circuit (T2), the multiplier (250), and the feedback circuit (220) for generating the pulse width modulated signal as a function of said difference between the reference input and the feedback signal.

4. Apparatus as claimed in claim 1, wherein the integer multiple is greater than one.

5. Apparatus as claimed in claim 4, wherein the integer multiple is two.

6. A CRT display comprising deflection apparatus as claimed in claim 11.

7. A computer system comprising: a processor for generating raster synchronisation signals and for varying the frequency of at least one of the raster synchronisation signals to produce different display modes; and a CRT display as claimed in claim 6 connected to the processor for producing a picture on the display in response to the raster synchronisation signals and for maintaining the size of the picture substantially constant between the different display modes.

8. Apparatus as claimed in claim 1, wherein the reference input, after being multiplied by the multiple of the frequency of the raster synchronisation signal, is combined with the feedback signal at a virtual ground.

9. Apparatus as claimed in claim 8, wherein the virtual ground is the inverting input of an amplifier.

10. Deflection apparatus for a raster scanned cathode ray tube display, the apparatus comprising:

a ramp generator (210) for receiving a raster synchronisation signal and for producing a raster scan signal synchronised to the raster synchronisation signal;

a reference source (270) for generating a reference input;

a ramp regulator (230) connected to the generator (210) for varying the amplitude of the scan signal as a function of the difference between the reference input and a feed back signal;

a feedback circuit (220) connected to the generator (210) and to the regulator (230) for generating the feedback signal as a function of the amplitude and frequency of the line scan signal;

a multiplier (250) connected to the regulator for multiplying the reference input by an integer multiple of the frequency of the raster synchronisation signal before said reference input is combined with said feedback signal.

11. Apparatus as claimed in claim 10, wherein the multiplier (250) comprises a switch circuit (T3) connected to the reference source (270) and to the regulator (230) for alternately connecting and disconnecting the reference source to the regulator (230) in synchronisation with the raster synchronisation signal.

12. Apparatus as claimed in claim 11, wherein the multiplier (250) further comprises a monostable circuit (280) connected to the switch circuit (T3) for generating pulses of predetermined length for switching the switch circuit in synchronisation with the raster synchronisation signal.

13. Apparatus as claimed in claim 12, wherein the generator (210) comprises a flyback circuit (T1); and the regulator (230) comprises a switch circuit (T2) for varying the voltage across the flyback circuit in response to a pulse width modulated signal, and a pulse width modulator (A1, A2,290) connected to the switch circuit (T2), the multiplier (250), and the feedback circuit (220) for generating the pulse width modulated signal as a function of said difference between the reference input and the feedback signal.

14. Apparatus as claimed in claim 10, wherein the integer multiple is greater than one.

15. Apparatus as claimed in claim 14, wherein the integer multiple is two.

16. A CRT display comprising deflection apparatus as claimed in claim 10.

17. A computer system comprising: a processor for generating raster synchronisation signals and for varying the frequency of at least one of the raster synchronisation signals to produce different display modes; and a CRT display as claimed in claim 16 connected to the processor for producing a picture on the display in response to the raster synchronisation signals and for maintaining the size of the picture substantially constant between the different display modes.

18. Apparatus as claimed in claim 10, wherein tile reference input, after being multiplied by the multiple of tile frequency of the raster synchronisation signal, is combined with the feedback signal at a virtual ground.

19. Apparatus as claimed in claim 18, wherein tile virtual ground is the inverting input of an amplifier.

20. Deflection apparatus for a raster scanned cathode ray tube display, the apparatus comprising:

a ramp generator (210) for receiving a raster synchronisation signal and for producing a raster scan signal synchronised to the raster synchronisation signal;

a reference source (270) for generating a reference input;

a ramp regulator (230) connected to the generator (210) for varying the amplitude of the scan signal as a function of the difference between the reference input and a feedback signal;

a feedback circuit (220) connected to the generator (210) and to the regulator (230) for generating the feedback signal as a function of the amplitude and frequency of the line scan signal; and a multiplier for multiplying the reference input by an integer multiple of the frequency of the raster synchronisation signal; said multiplier being connected for alternating the reference input between greater and lesser reference levels in synchronisation with the raster synchronisation signal.

* * * * *